(12) United States Patent
Martikkala et al.

(10) Patent No.: US 10,263,330 B2
(45) Date of Patent: Apr. 16, 2019

(54) ANTENNA ELEMENTS AND APPARATUS SUITABLE FOR AAS CALIBRATION BY SELECTIVE COUPLERLINE AND TRX RF SUBGROUPS

(71) Applicant: Nokia Solutions and Networks Oy, Espoo (FI)

(72) Inventors: Risto Tapani Martikkala, Oulu (FI); Asko Heikki Nykanen, Kuopio (FI)

(73) Assignee: Nokia Solutions and Networks Oy, Espoo (FI)

(*) Notice: Subject to any disclaimer, the term of this patent is extended or adjusted under 35 U.S.C. 154(b) by 229 days.

(21) Appl. No.: 15/165,105

(22) Filed: May 26, 2016

(65) Prior Publication Data
US 2017/0346182 A1 Nov. 30, 2017

(51) Int. Cl.
| | |
|---|---|
| *H01Q 3/00* | (2006.01) |
| *H01Q 3/26* | (2006.01) |
| *H01Q 21/00* | (2006.01) |
| *H01Q 3/40* | (2006.01) |
| *H01Q 25/00* | (2006.01) |

(Continued)

(52) U.S. Cl.
CPC .............. *H01Q 3/267* (2013.01); *H01Q 3/40* (2013.01); *H01Q 21/00* (2013.01); *H01P 5/187* (2013.01); *H01Q 1/241* (2013.01); *H01Q 1/246* (2013.01); *H01Q 3/26* (2013.01); *H01Q 21/065* (2013.01); *H01Q 25/00* (2013.01); *H04B 17/12* (2015.01);

(Continued)

(58) Field of Classification Search
CPC ............ H01Q 3/267; H01Q 3/40; H01Q 3/26; H01Q 21/00; H01Q 25/00

USPC .......................................... 342/368, 372, 373
See application file for complete search history.

(56) References Cited

U.S. PATENT DOCUMENTS

| | | | |
|---|---|---|---|
| 4,935,746 A | 6/1990 | Wells | 343/703 |
| 5,117,202 A | 5/1992 | Tsuruoka | 330/279 |

(Continued)

FOREIGN PATENT DOCUMENTS

| | | |
|---|---|---|
| CN | 1283901 A | 2/2001 |
| CN | 1399846 A | 2/2003 |

(Continued)

OTHER PUBLICATIONS

Wang Zhouhai et al.;"The X-band Sub-array Building Block for Active Scalable Array Antenna"; IEEE 2011; pp. 1090-1092.

*Primary Examiner* — Chuong P Nguyen
(74) *Attorney, Agent, or Firm* — Harrington & Smith

(57) ABSTRACT

An antenna arrangement includes an antenna element and a corresponding feeder line configured to feed a signal to and from the antenna element, and includes a portion of a couplerline spaced apart from but proximate to the antenna element, the feeder line, and a selectivity element. The portion of the couplerline is configured to receive via inductive coupling the signal from one or both of the feeder line and the antenna element, and to transmit a signal via inductive coupling to the feeder line and/or the antenna element. The antenna arrangement includes the selectivity element, which is spaced apart from but proximate to the antenna element, the feeder line, and the portion of the couplerline, and which is configured to select or not select the antenna element for coupling to the portion of the couplerline. An apparatus may include multiple antenna arrangements (with subgroups) and be configured for AAS calibration.

20 Claims, 7 Drawing Sheets

(51) Int. Cl.
    *H01P 5/18* (2006.01)
    *H01Q 1/24* (2006.01)
    *H01Q 21/06* (2006.01)
    *H04B 17/14* (2015.01)
    *H04W 72/04* (2009.01)
    *H04B 17/12* (2015.01)

(52) U.S. Cl.
    CPC ........... *H04B 17/14* (2015.01); *H04W 72/042* (2013.01); *H04W 72/0413* (2013.01)

(56) References Cited

U.S. PATENT DOCUMENTS

| | | | |
|---|---|---|---|
| 5,404,145 A | 4/1995 | Sa | 333/22 R |
| 5,412,414 A * | 5/1995 | Ast | G01S 7/4017 342/174 |
| 5,452,222 A | 9/1995 | Gray et al. | 702/122 |
| 5,539,418 A | 7/1996 | Egashira et al. | 343/712 |
| 6,339,399 B1 * | 1/2002 | Andersson | H01Q 3/267 342/174 |
| 6,483,466 B2 | 11/2002 | Liu | 343/702 |
| 6,624,784 B1 * | 9/2003 | Yamaguchi | H01Q 3/2605 342/372 |
| 6,647,276 B1 * | 11/2003 | Kuwahara | H01Q 1/246 375/226 |
| 6,762,717 B2 * | 7/2004 | Hirabe | H01Q 3/267 342/174 |
| 7,068,218 B2 * | 6/2006 | Gottl | H01Q 1/246 342/368 |
| 7,102,569 B2 * | 9/2006 | Tan | H01Q 3/267 342/368 |
| 7,132,906 B2 | 11/2006 | Podell | 333/109 |
| 7,132,950 B2 | 11/2006 | Stewart | 340/635 |
| 7,199,753 B2 * | 4/2007 | Pauplis | H01Q 3/267 342/174 |
| 7,903,030 B2 | 3/2011 | Nagai | 343/700 MS |
| 8,013,783 B2 * | 9/2011 | Lomes | H01Q 3/267 342/165 |
| 8,045,926 B2 * | 10/2011 | Martikkala | H04B 17/364 455/63.1 |
| 8,311,166 B2 * | 11/2012 | Kenington | H04B 17/21 370/334 |
| 9,300,408 B2 * | 3/2016 | Katipally | H01Q 3/267 |
| 2001/0007446 A1 | 7/2001 | Amano | 343/860 |
| 2002/0089447 A1 | 7/2002 | Li | 342/368 |
| 2007/0200651 A1 | 8/2007 | Kawai et al. | |
| 2009/0121948 A1 | 5/2009 | Nysen | 343/702 |
| 2009/0219213 A1 | 9/2009 | Lee et al. | 343/700 MS |
| 2010/0093282 A1 | 4/2010 | Martikkala et al. | 455/63.4 |
| 2012/0139776 A1 | 6/2012 | Malmqvist et al. | |
| 2013/0260844 A1 | 10/2013 | Rucki et al. | 455/575.7 |
| 2013/0265203 A1 * | 10/2013 | Ermutlu | H01Q 9/0457 343/703 |

FOREIGN PATENT DOCUMENTS

| | | |
|---|---|---|
| CN | 1792001 A | 6/2006 |
| EP | 1 962 374 A1 | 8/2008 |
| JP | H02119144 A | 5/1990 |
| JP | H03219714 A | 9/1991 |
| JP | H06291524 A | 10/1994 |
| JP | 2004/254227 A | 9/2004 |

\* cited by examiner

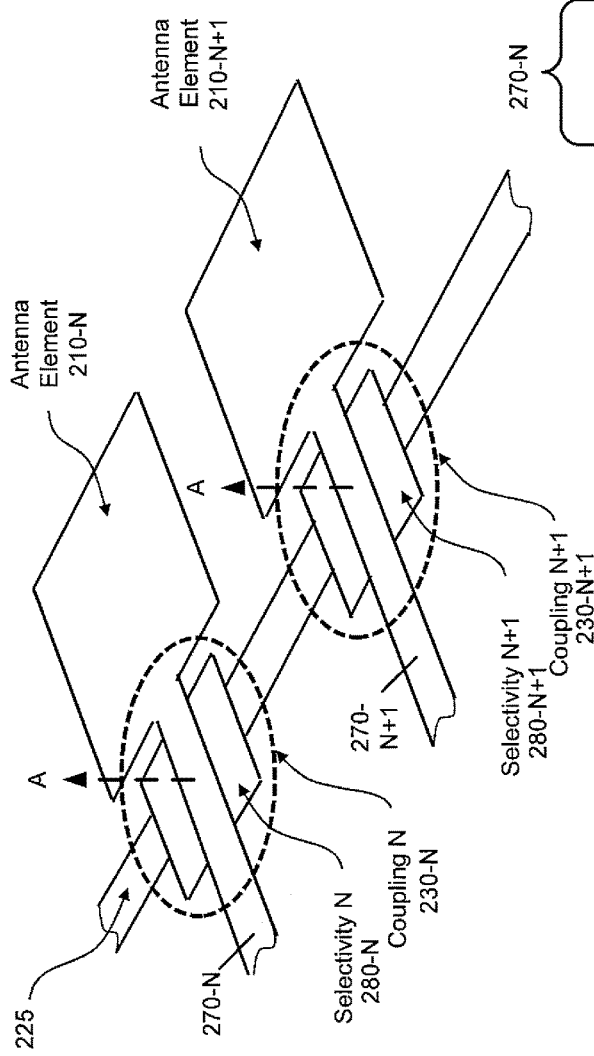
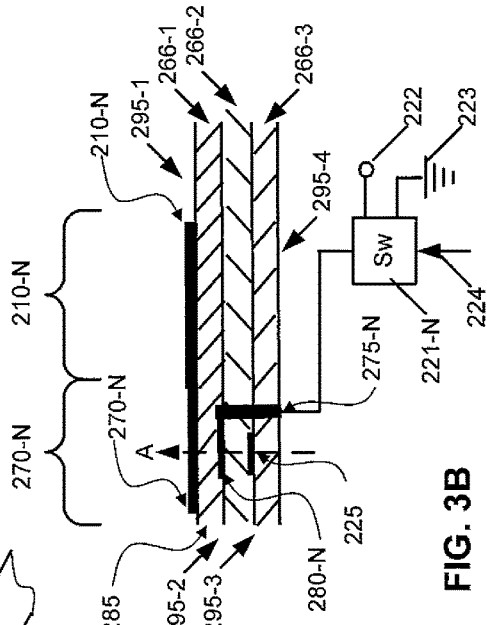
FIG. 3A
FIG. 3B

ANTENNA ELEMENTS AND APPARATUS SUITABLE FOR AAS CALIBRATION BY SELECTIVE COUPLERLINE AND TRX RF SUBGROUPS

TECHNICAL FIELD

This invention relates generally to wireless communications and, more specifically, relates to antenna elements suitable for calibration of antennas used in the wireless communications.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

In current active antenna calibration systems, the hardware circuits are providing access to all TRX ports simultaneously to allow phase difference measurement of the signals. Wilkinson-divider-based signal parallel coupling is used in some cases of TDD systems when the horizontal TRX ports are suitably close to each other and there is space for parallel combining parts. The Wilkinson divider (also called a Wilkinson power divider) is a well-known form of power splitter/power combiner that is often used in microwave applications. It uses quarter wave transformers, which are easily fabricated as quarter wave lines on printed circuit boards and as a result it offers the possibility of proving an inexpensive and simple splitter/divider/combiner while still providing high levels of performance. In multi-TRX constructions of, e.g., 3D beamforming and 5G, a serial bi-directional couplerline can be used instead, or multiple couplerlines can be, e.g., connected in parallel with Wilkinson dividers or switched, and the couplerline/couplerlines are measured from both ends of the line to eliminate the serial couplerline distance propagation effect between the coupling positions.

In the highest frequency AAS/5G implementations, there will be IF design and beamforming is made either by radiation element HW directly or with analogue/hybrid beamforming with phase adjustment blocks inside the high end frequency TRX sub groups. For this purpose, a high RF frequency sub group calibration can be used in addition to a whole system calibration to minimize the number of connections which need to be visible to/from the whole system calibration level.

Although current active antenna calibration systems are able to perform antenna calibrations, these systems could be improved.

BRIEF SUMMARY

This section is intended to include examples and is not intended to be limiting.

In an exemplary embodiment, an apparatus is disclosed that comprises an antenna arrangement. The antenna arrangement comprises an antenna element and a corresponding feeder line configured to feed a signal to and from the antenna element, and comprises a portion of a couplerline spaced apart from but proximate to the antenna element, the feeder line, and a selectivity element. The portion of the couplerline is configured to receive via inductive coupling the signal from one or both of the feeder line and the antenna element, and to transmit a signal via inductive coupling to one or both of the feeder line and the antenna element. The antenna arrangement comprises the selectivity element, which is spaced apart from but proximate to the antenna element, the feeder line, and the portion of the couplerline, and which is configured to select or not select the antenna element for coupling to the portion of the couplerline.

In another exemplary embodiment, the apparatus further may further comprise wherein the selectivity element is not coupled to a voltage or ground, which configures the selectivity element to select the antenna element for coupling to the portion of the couplerline; and wherein the selectivity element is coupled to ground to configure the selectivity element to not select the antenna element for coupling to the portion of the couplerline.

An apparatus as above may further comprise wherein the selectivity element is configured to select or not select the antenna element for coupling to the portion of the couplerline at least by being positioned between the portion of the couplerline and one or both of the feeder line and the antenna element in order to affect the inductive coupling between the portion of the couplerline and the one or both of the feeder line and the antenna element.

An apparatus as above may further comprise wherein the selectivity element is positioned between the portion of the couplerline and the feeder line, and wherein an axis passes through the selectivity element, the portion of the couplerline, and the feeder line but does not pass through the antenna element, wherein each of the selectivity element, the portion of the couplerline, and the feeder line are on different planes, and wherein the axis is perpendicular to the planes.

An apparatus as above may further comprise wherein an axis passes through the portion of the couplerline, the selectivity element, and the antenna element but does not pass through the feeder line, wherein each of the selectivity element, portion of the couplerline, and antenna element are on different planes, and wherein the axis is perpendicular to the planes.

An apparatus as above may further comprise wherein the antenna arrangement further comprises a switch coupled to the selectivity element and configured to connect the selectivity element to ground or to not connect the selectivity element to ground.

An apparatus as above may further comprise a plurality of the antenna arrangements, wherein the portions of the couplerlines for the plurality of the antenna arrangements are part of a single couplerline that serially connects to each of the plurality of antenna arrangements. An additional exemplary embodiment is the apparatus of this paragraph, wherein the apparatus further comprises at least one controller, and where the at least one controller is configured to cause the apparatus to: place a signal on the feeder line; configure at least one of the selectivity elements to select a corresponding at least antenna element for coupling to the single couplerline; and receive a signal from the portion of the single couplerline for antenna calibration. A further exemplary embodiment is the apparatus of this paragraph, wherein the apparatus further comprises at least one controller, and where the at least one controller is configured to cause the apparatus to: place a signal on the single couplerline; configure at least one selectivity element to select a corresponding at least one antenna element for coupling to the single couplerline; and receive a signal from the feeder line for antenna calibration.

Another exemplary embodiment is an apparatus as above, wherein the plurality of antenna arrangements are arranged in an array with columns and rows.

Another exemplary embodiment is an apparatus as above, wherein each of the plurality of antenna arrangements comprises a switch and a directional coupler, the switch configured to connect or not connect the couplerline to directional coupler, wherein each directional coupler is spaced apart from a corresponding feeder line but configured to inductively couple to the corresponding feeder line.

A further exemplary embodiment is an apparatus as above, wherein the couplerline is terminated at two ends, each of the two ends having a calibration port. Another exemplary embodiment is an apparatus of this paragraph, wherein the calibration ports are part of a beamformer, and the beamform is configured to apply signals to each of the antenna elements for beamforming. Another exemplary embodiment is an apparatus of this paragraph, further comprising at least one controller, where the at least one controller is configured to cause the apparatus to select individual ones or multiple ones of the plurality of antenna elements and perform antenna calibration with the individual ones or multiple ones of the plurality of antenna elements, the single couplerline and its calibration portions, and the selectivity elements. Another exemplary embodiment is an apparatus of this paragraph, wherein the at least one controller further comprises one or more processors and one or more memories, the one or more memories comprising computer program code, and wherein the one or more memories and the computer program code are configured, with the one or more processors, to cause the apparatus to perform the antenna calibration.

An additional exemplary embodiment is an apparatus as above, wherein the plurality of antenna arrangements form an antenna subarray, and wherein the apparatus comprises multiple subarrays, each with its own single couplerline. An apparatus as in this paragraph, further comprising a plurality of couplings, each set of plurality of couplings configured to direct downlink traffic data and uplink traffic data toward corresponding individual ones of the antenna subarrays and to corresponding selective bi-directional calibration couplerlines. An apparatus as in this paragraph is another example, wherein the plurality of couplings and selective bi-directional calibration couplerlines are coupled to at least one controller, and wherein the at least one controller is configured to select individual ones of the sets of couplings to perform antenna calibration of a corresponding antenna subarray. An apparatus as in this paragraph is a further example, wherein each antenna subarray has a corresponding beamformer and a set of the couplings, and each set of couplings directs downlink traffic data and uplink traffic data toward a corresponding beamformer.

Any configuration of the apparatus (e.g., such as operations to perform calibration) may be performed in whole or part by a computer program product comprising a computer-readable storage medium bearing computer program code embodied therein for use with a computer. The computer program code would comprise code for performing any of the operations for the configuration of the apparatus. Similarly, any configuration of the apparatus (e.g., operations to perform calibration) may be performed in whole or part by a computer program comprising code to perform the configuration of the apparatus when the computer program is run on a processor. The computer program may be a computer program product comprising a computer-readable medium bearing computer program code embodied therein for use with a computer.

BRIEF DESCRIPTION OF THE DRAWINGS

In the attached Drawing Figures:

FIG. 3A is an example of possible circuitry for two antenna elements of the antenna array of FIG. 2;

FIG. 3B is an example of a possible implementation of FIG. 3A using a PCB;

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for AAS calibration by selective couplerline and TRX RF subgroups. Additional description of these techniques is presented after a system into which the exemplary embodiments may be used is described.

Figure 1:
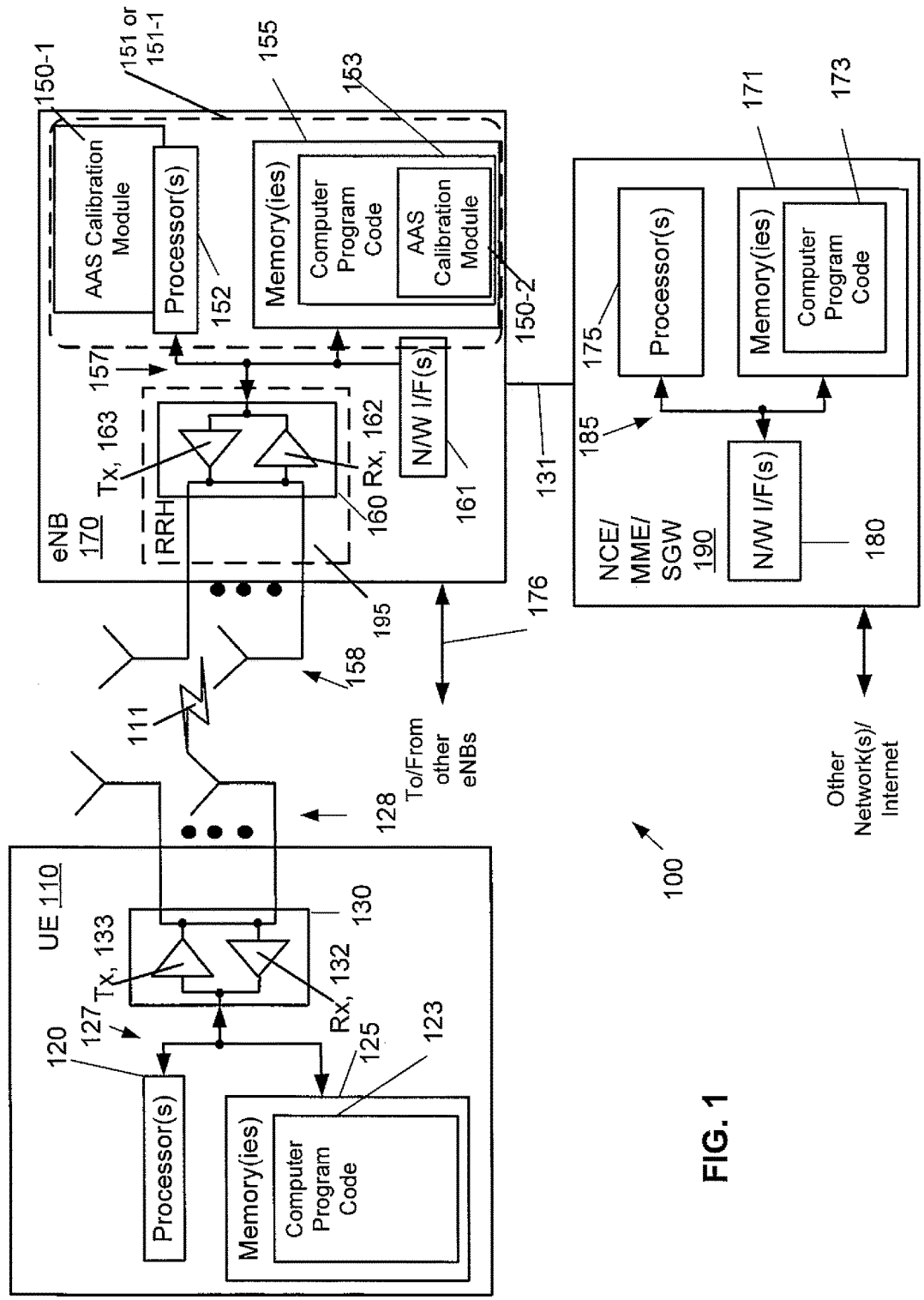
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 communicates with eNB 170 via a wireless link 111.

The eNB (evolved NodeB) 170 is a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to an antenna array 158. The one or more memories 155 include computer program code 153. The eNB 170 includes an AAS calibration module 150, comprising one of or both parts 150-1 and/or 150-2, which may be implemented in a number of ways. The AAS calibration module 150 may be implemented in hardware as AAS calibration module 150-1, such as being implemented as part of the one or more processors 152. The AAS calibration module 150-1 may be implemented also as an integrated circuit or through other hardware such as a programmable gate array. In another example, the AAS calibration module 150 may be implemented as AAS calibration module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface. The AAS calibration module 150 allows the eNB 170 to perform antenna calibration of the antenna array 158, as described below. The one or more memories 155 and the one or more processors 152 may form a controller 151 or may form one controller 151-1 of multiple controllers 151. For instance, the antenna calibration may be controller in part or completely from controller 151, although some amount of the calibration and the control of this may be passed to multiple other controllers (e.g., see controller 151-2 in FIG. 2 for instance), such that the controller 151 is one controller 151-1 of several controllers.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, allow the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

Having thus introduced one suitable but non-limiting technical context for the practice of the exemplary embodiments of this invention, the exemplary embodiments will now be described with greater specificity.

As described above, there are current active antenna calibration systems that are able to perform antenna calibrations. For many current AAS calibration systems, all signals are visible simultaneously and it is desirable to have all traffic run normally regardless of whether calibration is ongoing. That is, a digital signal processing DA/AD access is needed to all the ports. This is feasible with full digital beamforming systems requiring full DA/AD access anyway to all ports. For calibration, a special calibration code is used below the level of traffic data (that is, lower in power than traffic data to minimize disturbance of traffic throughput) to find correlation with the calibration code via the desired signal path that should not be influenced by the other TRX paths only carrying traffic data.

In higher 5G frequency bands, the number of TRX ports required to compensate the propagation path loss is so big that full digital beamforming is no longer sensible to use, so analogue beamforming or a hybrid of analogue and digital beamforming will be used instead to form the desired radiation beam patterns. More specifically, higher bands in 5G is generally meant to be the frequencies above 6 GHz (where analogue beamforming is likely preferred instead of fully digital beamforming, or, e.g., above 15GHz going to millimeter wavelength), where propagation loss due to frequency is increasing such that a high number of antenna elements is required to achieve adequate element gain to compensate propagation loss better. For this purpose, the non-selective bi-directional couplerline can be still used to capture the signal routes, but as there is no longer access to all high frequency RF TRX paths from the digital domain, a separate AD/DA access needs to route from/to beamforming processing to recognize the desired path signal route from the others. However, this requires AD/DA access and selective switching between the IF RF parts and high frequency RF TRX sub-group parts. If it is desired to manage this with fewer AD/DA connections, the high frequency TRX subgroup calibration may provide the lowest complexity by using analogue methods in defining the signal path phase relations. This could be performed by feedback phase adjustment and combining with the same signal from another pipe or input/output to lock the phase data to a known reference, which can then be measured in an outer coupling circuit of the whole system. This would link the sub group's data for a whole system compensation purpose.

Some techniques for calibration include the following. Serial measurement is illustrated in U.S. Publication No. 2013/0265203, by inventors Murat W. Ermutlu and Risto T. Martikkala, filed on Oct. 28, 2010. For instance, FIG. 5 of U.S. Publication No. 2013/0265203 shows a single calibration line used for many antenna elements. Another calibration is performed with couplers that are connected to switches. See U.S. Publication No. 2013/0260844, by inventors John S. Rucki, et al., filed on Mar. 15, 2013. See, e.g., FIG. 1 of U.S. Publication No. 2013/0260844. With this there is selection (120) made which selects which of the couplers (112(n)) measurement is used.

Although these current AAS calibration techniques can provide calibration, 5G antennas require more information than older active antennas. New implementations are needed that provide more accurate information.

Implementations herein can use a serial calibration line, but switches between couplers and calibration line are also used. With this system, the information from which element or elements is to be measured can be selected. Control of these switches can be from transmission lines, so no external cabling may be required.

Furthermore, using AAS calibration serial bi-directional couplerline together with directive couplers at TRX ports selectively coupled by, e.g., RF switches can enhance the calibration method. In particular, it is not necessary to use a calibration code. Furthermore, in, e.g., analogue beamforming a code most likely cannot be used to select the measured port, as the digital domain does not have access to individual ports, but instead to all or group of ports at once. There can be a directive coupler connected via an RF switch to the bi-directional couplerline, so the coupling provides also more tolerance of reflections from the environment due to more directivity. The bi-directional couplerline is still used to measure from both ends to eliminate physical distance propagation effects between the coupling points. The RF subgroups of analogue phase adjustments can also include a calibration feedback circuit coupled in a similar way selectively inside the RF TRX sub group. This provides a simple feedback phase adjustment and combining circuit, and combined signal level detection can be used to define each signal phase difference either to master TRX input or output. For the uplink direction, a calibration code, pilot, or some wideband modulation is used to define the RF subgroup phase relations. The RF sub group master TRX input or output is then measured through selective bi-directional multi TRX couplerline to define the phase difference between the Master TRXs to define phase correction for all the TRX ports.

The following figures show hybrid/analogue beamforming circuits with IF TRX of AD/DA access and RF TRX's without AD/DA selective access of the ports. If desired to create selective AD/DA access with calibration codes to/from RF TRX sub group paths individually, it could also be implemented by selective bi-directional couplerline at RF TRX sub group inputs taken to/from AD/DA parts, e.g., of the IF TRX.

Prior to additional description of the exemplary embodiments, consider the following points.

One potential problem with analog/hybrid BF is that some specific solution to select TX/RX line to be calibrated is needed. One exemplary solution is to combine a bi-directional coupler line with TX/RX selection possibilities as described herein.

Another potential problem for analog/hybrid BF is that a solution will most likely to be used with high frequency bands (which equates to small filters and antennas), so external calibration circuits can be tricky to implement due available space and physical accuracy that is needed and high cable losses with long feeds (relative to RF signal wave length). In this context, "high" frequency bands mean, e.g., above 6 GHz 5G frequency bands or above 15 GHz to millimeter wavelength where analogue beamforming is the most likely implementation due to number of TRX's and wavelength is so small that fully digital beamforming implementation is too difficult or overkill in cost and size of making base stations with fully digital BF. The massive MiMo usability due to enough multipath in the air interface channel behavior is best at low frequencies (e.g., below 6 GHz) and thus digital access/beamforming is mostly valid only at low frequencies, and where the wavelength is bigger and unit HW cost/size is feasible to make fully digital. An exemplary solution for these issues is the selective coupler line that can be integrated to the TRX or the antenna structures itself, as described herein.

A further potential problem with hybrid BF and high frequency bands, is that it is generally necessary to use integrated RF chips to meet RF space requirements. But as there are hard limits for practical ICs sizes, the complete hybrid BF system will require usually more than one RF IC and then there comes the need to calibrate TRX between different RF ICs. One possible solution in exemplary embodiments herein is a sub-group of TRX antenna elements (e.g., those served with one RF IC) can be calibrated to each other and then those sub-groups (e.g., over multiple ICs) can be calibrated to each other in order to calibrate the whole system.

Figure 2:
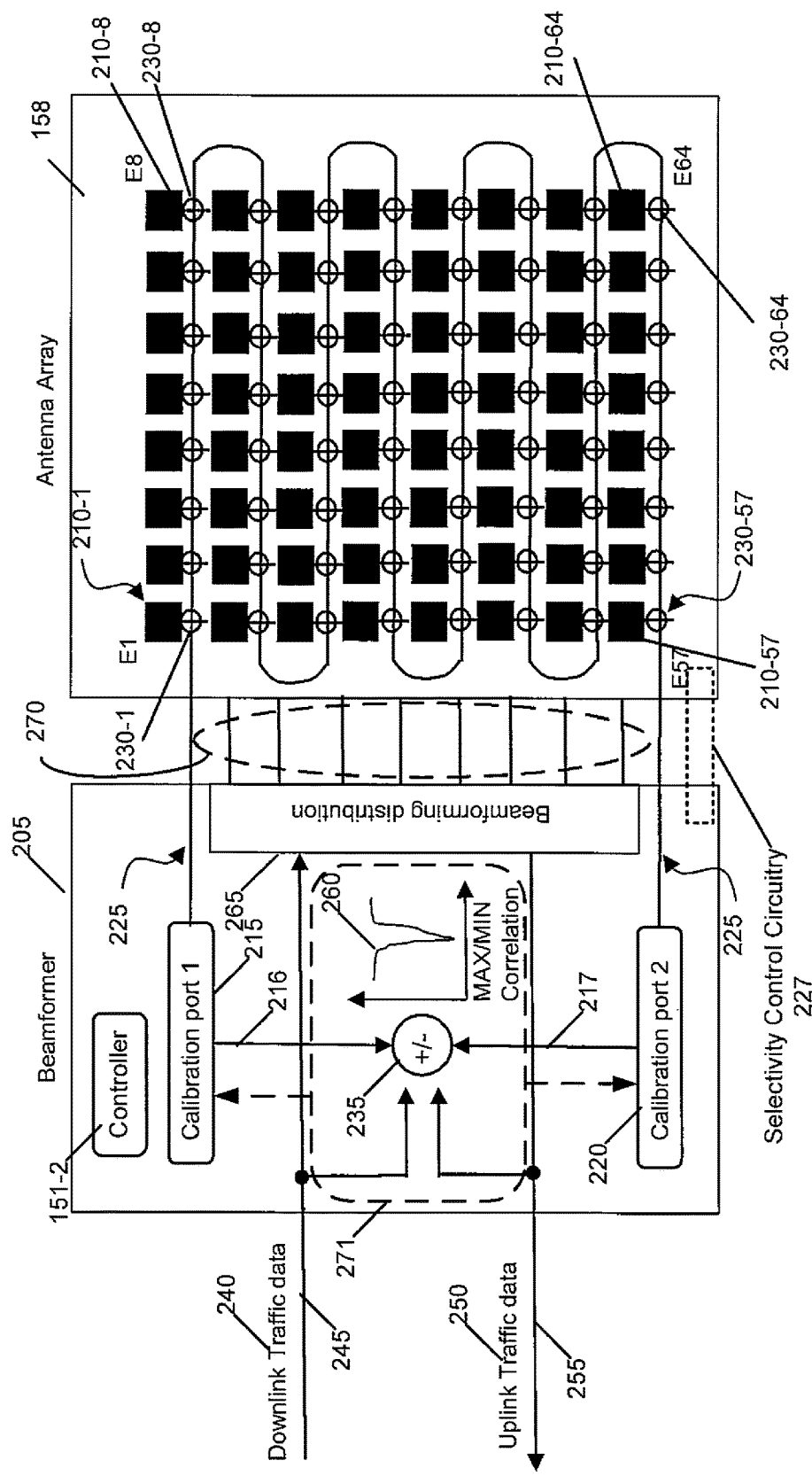
FIG. 2 is an illustration of a single calibration line example for AAS calibration by selective couplerline in an exemplary embodiment.

Turning to FIG. 2, this figure shows the antenna array 158 coupled to a beamformer 205. The beamformer 205 forms part of the transceiver 160 of FIG. 1. The antenna array 158 has 64 antenna elements (E1 through E64), which are labelled as 210-1 through 210-64, respectively. Antenna elements E1 210-1, E8 210-8, E57 210-57, and E64 210-64 have reference numbers in FIG. 2. Each antenna element 210 is a radiating element used to transmit or receive data. Associated with each antenna element 210 is a coupling region 230. Coupling regions 230-1, 230-8, 230-57, and 230-64 have reference numbers and correspond to antenna elements E1 210-1, E8 210-8, E57 210-57, and E64 210-64, respectively. The coupling regions 230 illustrate approximate regions where physical coupling and/or electrical coupling are/is occurring between the elements. There is a single selective bi-directional calibration couplerline 225 that connects the coupling regions 230 to the beamformer 205 (via calibration ports 215 and 220). The beamformer 205 may include a controller 151-2, which may perform and control some or all of the antenna calibration for the antenna array 158.

As described in more detail below (e.g., see FIGS. 3 and 4), the coupling regions 230 have selectivity elements 280 that allow individual ones of the antenna elements 210 to be selected for calibration. To enable this selection, the selectivity control circuitry 227 is used. This circuitry 227 resides at least in part in the antenna array 158 and may also reside in part in the beamformer 205 (such as in RFIC(s) or TRX(s)). For example, the selectivity control circuitry 227 may be implemented by circuitry in RFICs, for instance, which may use TRX ASIC's/FPGA's available control pins, and may select the individual ones of the selectivity elements according, e.g., to selection messages (e.g., sent over a bus) from the beamformer and its correlation performing algorithm. Other examples are possible. For instance, in FIG. 2 there are 64 antenna elements 210, which could correspond to 6 bits. The selectivity control circuitry 227 could have a 6-bit register, and the controller 151-2 could write (e.g., via a message) into the 6-bit register and therefore select one of the antenna elements 210. For example, 000001 could select 210-1, 000010 could select 210-2, 00001 could select 210-3, and the like. Multiple ones of the antenna elements 210 could be selected using more bits, such as using 64 bits, or using a series of messages. The selectivity control circuitry 227 can output individual (or multiple) control signals (illustrated in FIGS. 3B and 4B) to each selectivity element 280.

The beamformer 205 comprises the calibration ports 215 and 220, beamforming distribution circuitry 265, and an adder 235. Downlink traffic data 240 comes from the internals of the eNB 170 and is communicated to the beamforming distribution circuitry 265 via the link 245 (e.g., which may be implemented via the bus 157). The downlink traffic data 240 is transmitted via the antenna array 158. The uplink traffic data 250 is received by the antenna array 158, passes through the beamforming distribution circuitry 265 and is passed to the internals of the eNB 170 via the link 255 (e.g., which may be implemented via the bus 157). The beamforming distribution circuitry 265 performs distribution of downlink traffic data 240 to the antenna array 158 via feeder lines 270 to be transmitted by the array, and performs distribution of signals received by the antenna array 158-1 and on the feeder lines 270 to the uplink traffic data 250.

The calibration ports 215, 220 are used during calibration as described here and below. The circuitry 271 may include a special calibration receiver/transmitter part (e.g., as a mobile chip in FD LTE) or existing TRX ports (e.g., in TD LTE and 5G, as some—such as one or two—of the normal ports are used in addition to traffic transfer to perform simultaneously the measurement in the opposite TX/RX direction as the frequency of TX/RX is the same. The special calibration receiver/transmitter part may access signals on and/or provide signals to the calibration ports 215, 220. The circuitry 271 may also include or be separate from the adder 235 and the correlation 260 (which may be performed by circuitry, such as in the processor(s) 152 or by special-purpose circuitry). One or both of the adder 235 and correlation 260 may be performed by the processor(s) 152, e.g., under control of the AAS calibration module 150.

Information on the links 245, 255, 216, and 217 may be compared, after being added (or subtracted) by the adder 235 to create a MAX/MIN (maximum or minimum) correlation 260. More particularly, the comparison is between a DL path (via link 245) and calibration feedback (received via links 216 and 217) (in a DL calibration phase) or between a calibration signal (sent via link 216 and 217) and feedback received from an UL path (via link 255) (in an UL calibration phase). The correlation 260 may mean include digital signal comparison of, e.g., the transmitted modulation that is decoded and compared to the reference phase of the same signal in a different position of the data chain, commonly usable for comparison of the measured port phase. The correlation 260 may also be a very low level intelligence type of correlation/comparison, e.g., by combining two signals and measuring the combined signal amplitude while varying the comparing feedback phase of each of them to search for which phase adjustment shows a highest level and what shows a lowest level, meaning equal and opposite phase of the two signals. Full wavelength latency differences that are less than tens of wavelengths in RF frequency can usually be ignored in the comparison, and extra delay can be applied prior to the simple combining and amplitude detection, if there is big latency difference to compensate for between the two signals used for comparison. There can be a common selected reference point of signals to use for all measurements or the signals are, e.g., compared to each other in pairs of two, e.g., if using the simplest analogue methods or it is important to have a common Local Oscillator (LO) for the ports that there is no big absolute phase value drift due to frequency offset.

FIG. 3A is an example of possible circuitry for two antenna elements of the antenna array of FIG. 2 and is used to explain calibration in more detail. Two antenna elements 210-N and 210-N+1 are shown, as are their corresponding feeder lines 270-N and 270-N+1. The selective bi-directional calibration couplerline 225 passes underneath (in this example) the feeder lines 270 substantially perpendicular to the feeder lines 270. Between the couplerline 225 and a feeder line 270 is a corresponding selectivity element (such as being or including a pad) 280, which may be grounded or not and is used for selection of an antenna element 210. That is, there is a selectivity element N 280-N for the antenna element N 210-N and a selectivity element N+1 280-N+1 for the antenna element N+1 210-N+1. Additionally, associated with each selectivity element 280 and each element 210 is a corresponding coupling region 230. There is a coupling region N 230-N for the selectivity element N 280-N and the antenna element N 210-N and a coupling region N+1 230-N+1 for the selectivity element N+1 280-N+1 for the antenna element N+1 210-N+1.

There are a number of ways the antenna elements in FIG. 3A may be implemented. FIG. 3B is one example of a possible implementation of FIG. 3A using a PCB 285. In this example, a portion of PCB 285 is shown comprising one antenna element 210-N. The PCB 285 comprises a number of layers, including four conductive (typically copper) layers 295-1, 295-2, 295-3, and 295-4 and three insulating layers 266-1, 266-2, and 266-3. The antenna element 210-N is an area on the conductive layer 295-1, and the feeder line 270 is also on the conductive layer 295-1 for this example. The couplerline 225 is implemented at least in part as a conductive trace in the conductive layer 295-3. The selectivity element 280-N is illustrated as being in the conductive layer 295-2 and is connected to a via 275-N. The via 275-N would be accessible by the beamformer 205 (and/or the AAS calibration module 150).

There is a switch (Sw) 221-N shown, and the switch is coupled to the selectivity control circuitry 227 by one or more control signals 224 and is coupled to the selectivity element 280-N. The switch 221-N and the coupling to the selectivity control circuitry 227 and the selectivity element 280-N are expected to be formed on or in the PCB 285, but are shown separate from the PCB 285 for ease of exposition. The switch Sw 221-N can couple the selectivity element 280-N to either ground 223 or an open connection 222 (i.e., the selectivity element 280-N would be left floating if the switch Sw 221-N couples the selectivity element 280-N to the open connection 222 and is not connected to any voltage source or ground). The term "coupled" does not exclude other elements being between two devices, although typically the two devices would be connected using conductive elements such as a wiring in a conductive PCB layer. The switch 221 can be any suitable switch, such as a single position single throw switch (i.e., connects or does not connect to ground), a single position double throw switch (i.e., one terminal connects to ground and one terminal is floating), or the like, comprising one or more MOSFETs, one or more BJTs, one or more relays, or the like. The selectivity switch 221 can also be implemented with, e.g., a capacitive diode coupling controlled by DC voltage cross the diode, higher voltage either grounding the coupling or enabling the coupling, depending how the diode is connected to perform the selection.

Both FIGS. 3A and 3B show an axis A. It can be seen that the selectivity element 280 is positioned between the couplerline 225 and the feeder line 270. Further, the axis A passes through the selectivity element 280, couplerline 225, and feeder line 270 but does not pass through the antenna element 210. Each of the selectivity element 280, couplerline 225, and feeder line 270 are on different planes (e.g., the planes for the surfaces of the insulating layers 266 and/or the conductive layers 295). The axis A is perpendicular to the planes. The selectivity element 280 in this example can affect inductive coupling between the couplerline 225 and the feeder line 270. In particular, the selectivity element 280 will have a major negative effect (that is, reduce dramatically or potentially block) on the inductive coupling if the selectivity element 280 is grounded. The selectivity element 280 will have little effect (that is, little reduction) on the inductive coupling if the selectivity element 280 is left floating by not connecting the selectivity element 280 to ground or to a voltage.

Figure 4A:
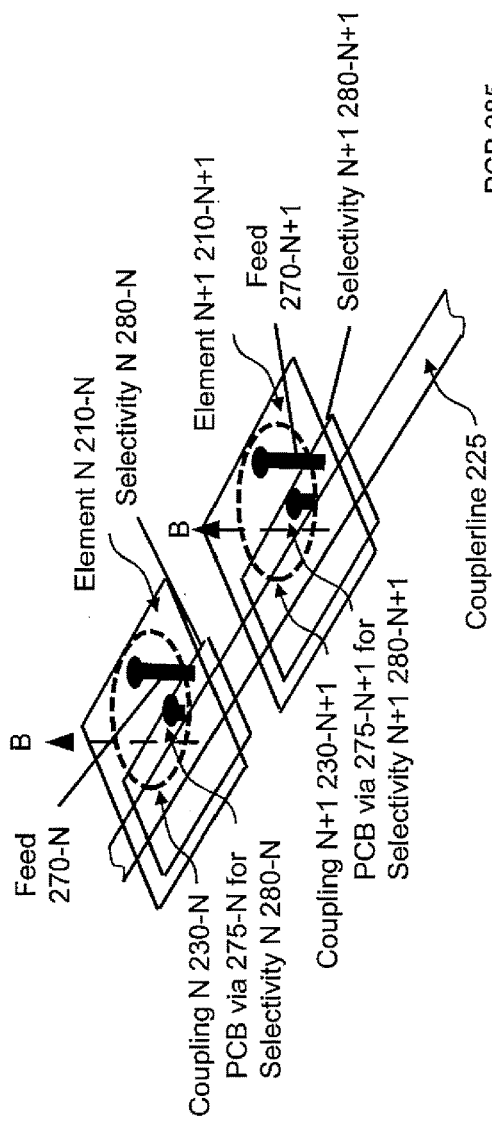
FIG. 4A is another example of possible circuitry for two antenna elements of the antenna array of FIG. 2.
Figure 4B:
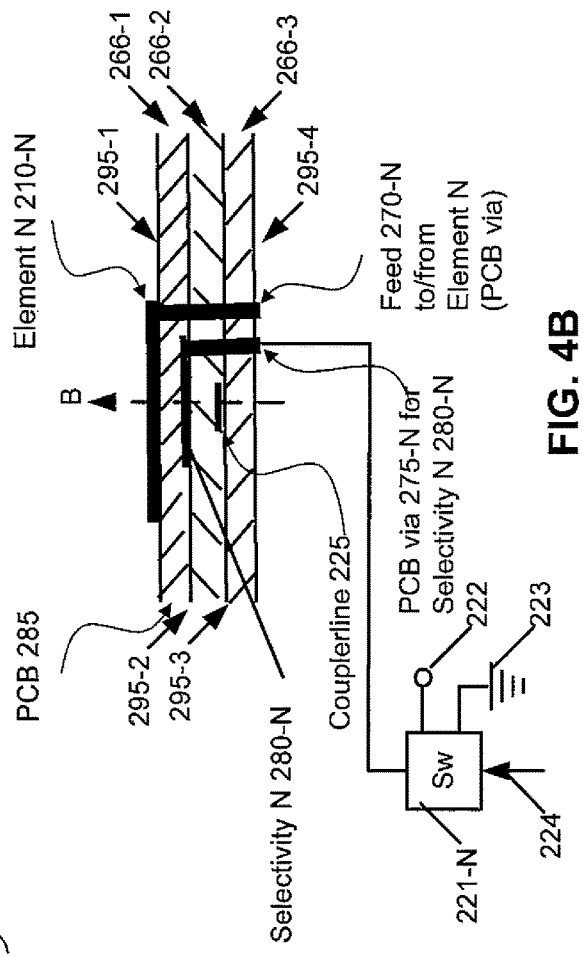
FIG. 4B is an example of a possible implementation of FIG. 4A using a PCB.

Turning to FIGS. 4A and 4B, FIG. 4A illustrates another example of possible circuitry for two antenna elements of the antenna array of FIG. 2, and FIG. 4B is an example of a possible implementation of FIG. 4A using a PCB 285. The two antenna elements N 270-N and N+1 270-N+1 are shown. Corresponding coupling regions 230-N and 230-N+1 are also shown, as are selectivity elements 280-N and 280-N+1 which are shown as conductive pads. The corresponding feeder lines 270-N and 270-N+1 are connected to the antenna element N 210-N or N+1 210-N+1, respectively. FIG. 4B illustrates that the antenna element 210-N is an area on the conductive layer 295-1, and the feeder line 270-N (shown as feed 270-N) is a via (at least in part) and is connected to another part of the feeder line 270 that is not shown but could be in the conductive layer 295-4. The couplerline 225 is implemented at least in part as a conductive trace in the conductive layer 295-3. The selectivity element 280-N is illustrated as being in the conductive layer 295-2 and is connected to a via 275-N that terminates also on the conductive layer 295-4. The via 275-N would be accessible by the beamformer 205 (and/or the AAS calibration module 150).

FIGS. 4A and 4B also show an axis B. It can be seen in these figures that the axis B passes through the couplerline 225, the selectivity element 280-N, and the antenna element 210 but does not pass through the feeder line 270. Each of the selectivity element 280, couplerline 225, and antenna element 210 are on different planes (at least in the part shown), and the axis B is perpendicular to the planes. The planes are the planes for the surfaces of the insulating layers 266 and/or the conductive layers 295. The selectivity element 280 in this example can reduce (e.g., block) or allow coupling between the couplerline 225 and the antenna element, depending on whether the selectivity element 280 is grounded or not (respectively). The axis B is perpendicular to the planes. The selectivity element 280 in this example can reduce (e.g., block) or allow coupling between the couplerline 225 and the feeder line 270, depending on whether the selectivity element 280 is grounded or not (respectively).

Figure 5:
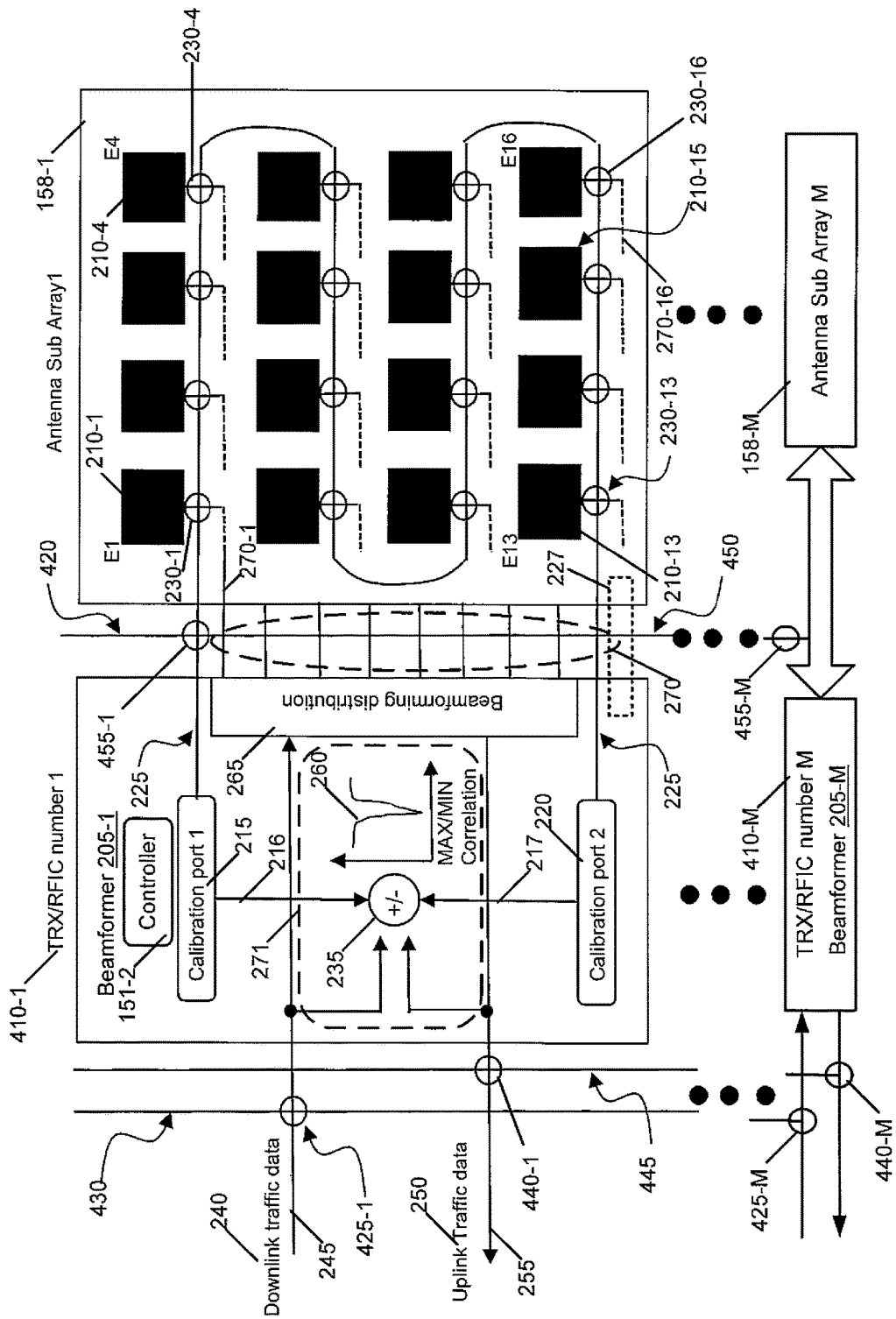
FIG. 5 is a multiple calibration line implementation example for AAS calibration by selective couplerline and TRX RF subgroups in an exemplary embodiment.

The examples of FIGS. 2, 3A, and 4A are directed to an entire antenna array 158. However, the techniques may also be applied to multiple antenna arrays. In particular, the RF subgroups of analogue phase adjustments can also include a calibration feedback circuit coupled in a similar way selectively inside the RF TRX sub group. FIG. 5 is an example of this, and this figure is a multiple calibration line implementation example for AAS calibration by selective couplerline and TRX RF subgroups in an exemplary embodiment.

In this example, there are M TRX/RFICs 410, which are shown as TRXJRFIC number 1 410-1 through TRX/RFIC number M 410-M. Each TRX/RFIC 410 comprises a beamformer 205, such that there are beamformers 205-1 through 205-M. Each TRX/RFIC number 410/beamformer 205 is connected to an antenna subarray 158. Antenna subarrays 158-1 through 158-M are shown. There are two selective bi-directional calibration couplerlines 430, 445 for the TRX/RFIC level. The selective couplings 425-1 through 425-M select downlink traffic data 245 for one (or more) of the TRX/RFICs 410 to be put on the couplerline 430. By default, only one TRX/RFIC 410 is selected at a time, and they are all selected individually, but it could be possible to select multiple ones of the TRX/RFICs 410. Similarly, the selective couplings 440-1 through 440-M select uplink traffic data 255 for one (or more) of the TRX/RFICs 410 to put on the couplerline 445. Again, by default, only TRX/RFIC 410 is selected at a time. For instance, the selective couplings 425-1 and 440-1 may be configured to cause the downlink traffic data 240 and the uplink traffic data 250 to be coupled to the couplerlines 430 and 445, respectively, but all of the other selective couplings 425-2 through 425-M and 440-2 through 440-M may be configured to prevent the downlink traffic data 240 and the uplink traffic data 250 from being coupled to the couplerlines 430 and 445. The default selection is one-by-one, such that only one TRX/RFIC 410 is selected at a time, but the selective couplings 425 and 440 may be used to select multiple ones of the TRX/RFICs 410 to be calibrated. The couplerlines 430 go "upstream", such as to the AAS calibration module 150 or other such controller 151.

Additionally, there is a bi-directional calibration couplerline 225 that is controlled by the selective coupling 455 for the beamformer level. There is one (in this example) selective coupling 455 for each of the TRX/RFICs 410 and corresponding antenna subarray 158. Each coupling 455 can connect the calibration port 1 215 and the couplerline 225 to a corresponding antenna subarray 158, or can disconnect the calibration port 1 215 and the couplerline 225 from a corresponding antenna subarray 158. The couplings 425, 440, and 455 should be operated in unison. That is, the eNB 170 controls these to select which TRX/RFIC(s) 410 and corresponding antenna subarray(s) are performing calibration.

In this example, each antenna subarray 158 includes coupling regions 230-1 through 230-16, each of which is associated with a corresponding antenna element 210. The feeder lines 270 are shown in more detail in this figure. In particular, feeder lines 270-1 through 270-16 are shown.

Figure 6:
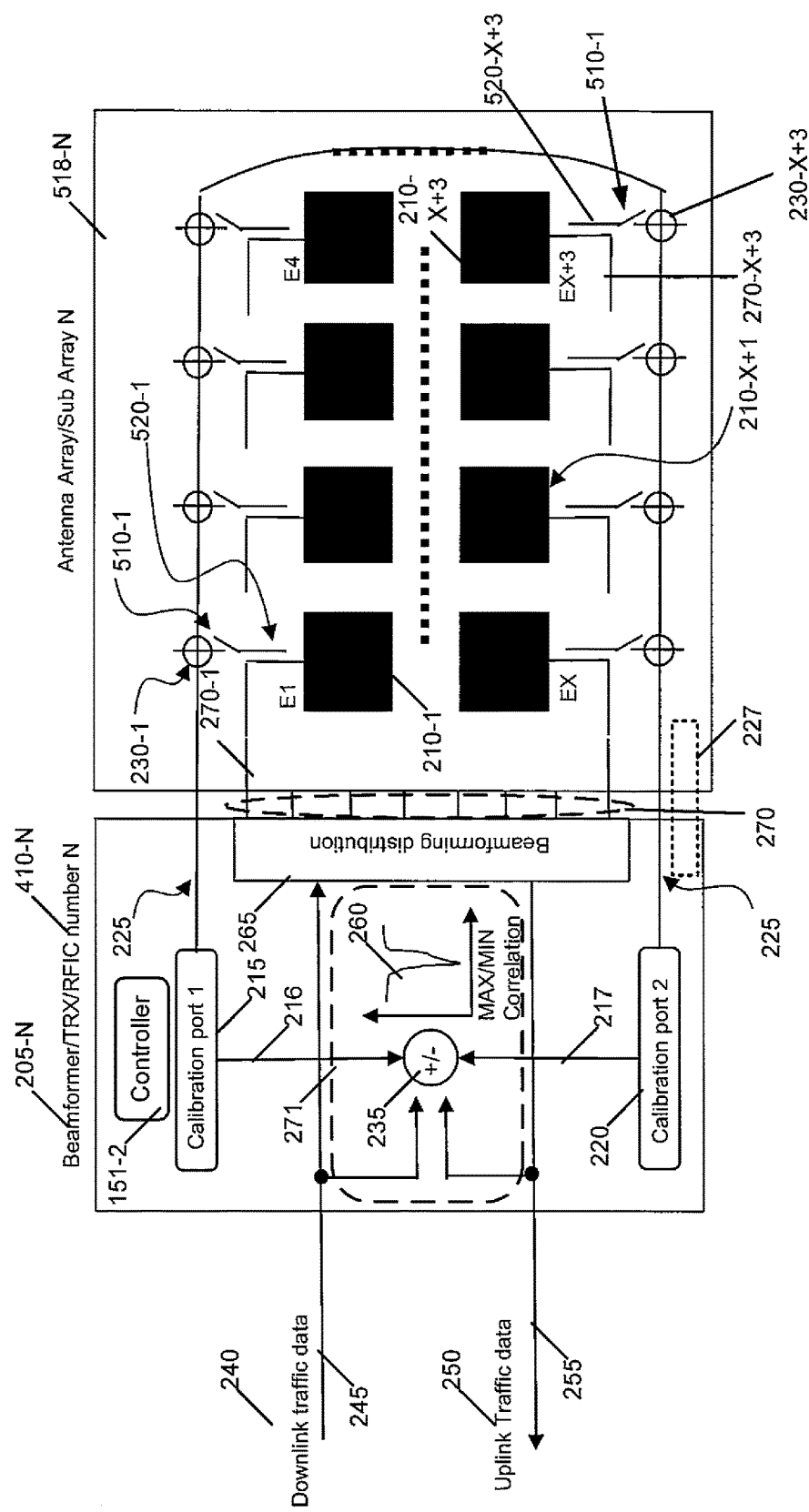
FIG. 6 is a calibration line coupling directivity enhanced example for AAS calibration by selective couplerline and TRX RF subgroups in an exemplary embodiment.

Referring to FIG. 6, this figure is a calibration line coupling directivity enhanced example for AAS calibration by selective couperline and TRX RF subgroups in an exemplary embodiment. This example uses M beamformers 205, RRX/RFICs 410 and antenna subarrays 158 and shows one (an Nth one) of the beamformers 205-N, RRX/RFIC 410-N and antenna subarray 158-N. The antenna subarray 158-N comprises X+3 antenna elements 210-1 through 210-X+3. Each antenna element 210 has a corresponding coupling region 230, a switch 510 and a directional coupler 520. Thus, coupling regions 230-1 through 230-X+3, switches 510-1 through 510-X+3, and directional couplers 520-1 through 520-X+3 are shown. Individual switches 510 are controlled via circuitry not shown. Such switches 510 could be, e.g., FETs or relays. A directional coupler 520 is spaced apart from a corresponding feeder line 270 but is used to inductively couple to (and therefore measure signals on) the feeder line 270. The selective couplings 425, 440 and 455 maybe used in FIG. 6 to couple the DL/UL traffic data and the beamformer(s) to the antenna subarray. That is, selectivity is still the same, but a directional coupler at each port provides additional tolerance towards possible environmental reflections of the signal coming back to the element, but even in worst reflections the direct signal is always stronger than reflections, but directivity can improve and still use couperline solution and selectivity.

Figure 7:
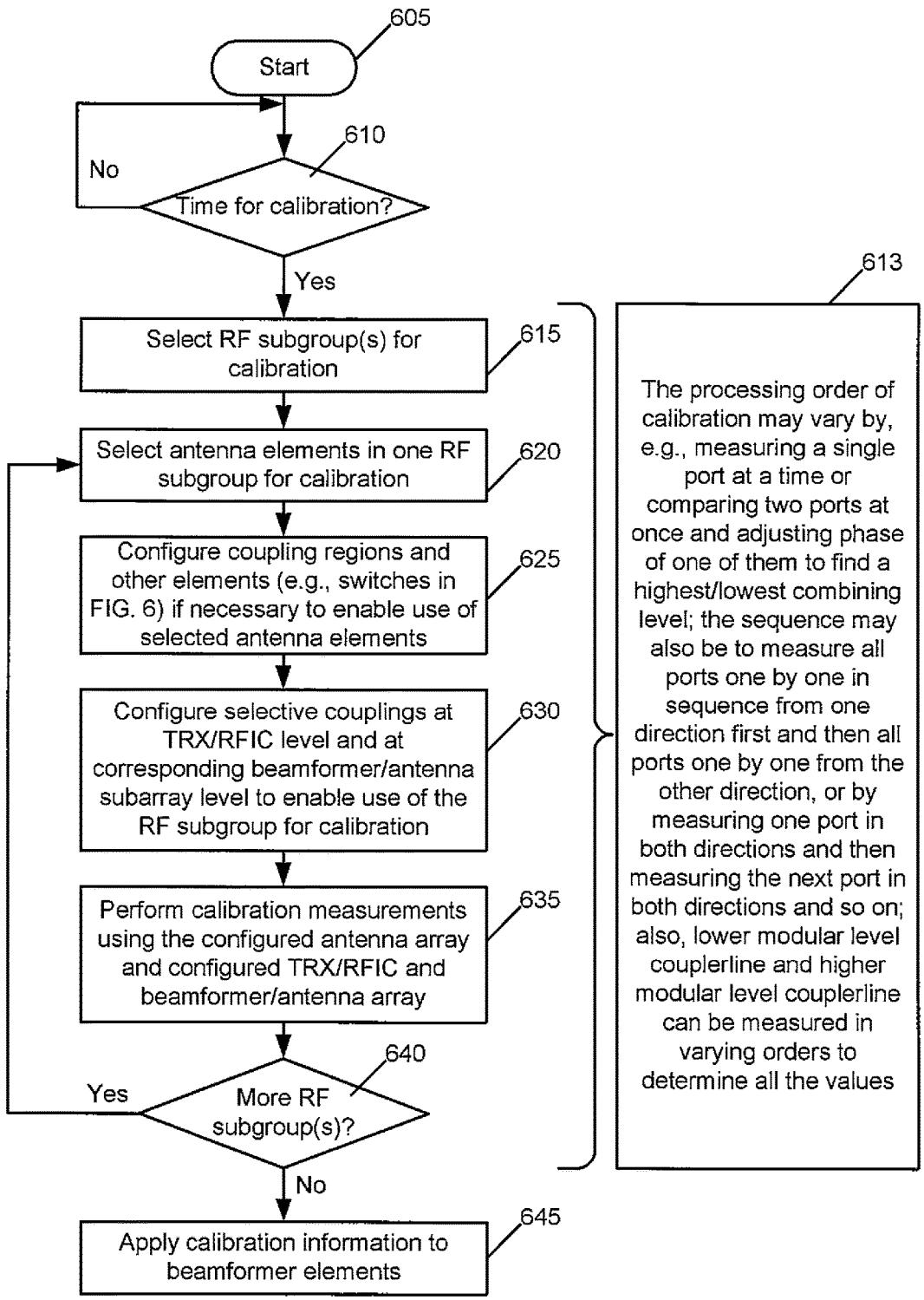
FIG. 7 is a logic flow diagram for AAS calibration by selective couplerline and TRX RF subgroups, and illustrates the operation of an exemplary method, a result of execution of computer program instructions embodied on a computer readable memory, functions performed by logic implemented in hardware, and/or interconnected means for performing functions in accordance with exemplary embodiments.

FIG. 7 is a logic flow diagram for AAS calibration by selective couperline and TRX RF subgroups, and illustrates the operation of an exemplary method, a result of execution of computer program instructions embodied on a computer readable memory, functions performed by logic implemented in hardware, and/or interconnected means for performing functions in accordance with exemplary embodiments. The blocks in FIG. 7 are assumed to be performed by a base station or other network node, such as the eNB 170, e.g., under control in part by the AAS calibration module 150. For ease of reference, a base station will be assumed to perform the blocks in FIG. 7, but this is merely an example. Without calibration, element array phases would be random and radiation patterns totally unusable in quality. With calibration, on the other hand, necessary phase correction information can be written to the signal paths of TX and RX, for example, to the phase adjustment parts in TX and RX HW parts (e.g., in analog beamforming phase shifters) or on, e.g., complex multipliers of I&Q data of each traffic signal (in digital beamforming case in the digital domain before TRX HW RF parts).

The flow in FIG. 7 starts in block 605. In block 610, the base station determines whether it is time for calibration. If not (block 610=No), the flow proceeds back to block 610. If so (block 610=Yes), the flow proceeds to a set of blocks where calibration is performed. It is noted that there are many different techniques for performing calibration. Block 613 indicates some of these. In block 613, it is shown that the processing order of calibration may vary by, e.g., measuring a single port at a time or comparing two ports at once and adjusting the phase of one of them to find a highest/lowest combining level. Additionally, the sequence may also be to measure all ports one-by-one in sequence from one direction (e.g., uplink) first and then all ports one by one from the other direction (e.g., downlink). As another example, the sequence may be measuring one port in both directions and then measuring the next port in both directions and so on. Also, lower modular level couperline and higher modular level couperline can be measured in varying orders to determine all the calibration values.

In terms of one possible flow, in block 615 the base station selects the RF subgroup(s) for calibration. The base station in block 620 selects the antenna elements in one of the selected RF subgroup(s) for calibration. In block 625, the base station configures coupling regions and other elements (e.g., switches in FIG. 6) to enable use of selected antenna elements.

In block 630, the base station configures selective couplings (e.g., selective couplings 425 and 445) at the TRX/RFIC level and at the corresponding beamformer/antenna subarray level (e.g., selective couplings 455) to enable use of the RF subgroup for calibration. The base station in block 635 performs calibration measurements using the configured antenna array (e.g., with its selected antenna elements) and configured TRX/RFIC and beamformer/antenna array(s) (i.e., configured in order to select the RF subgroup being calibrated). Note that the calibration in block 635 may take place while the antenna array/subarray is transmitting and/or receiving data. Note that the applying of the phase correction to the TX and RX paths or beamformer matrix is usually performed later after measuring (e.g., and computing and storing the results), and in digital beamforming the actual result handling typically uses some phase drift estimation to select a time period to run the next measurements or, e.g., thermal information of the unit is used to estimate the next measurement to do or to perform filtering to make the raw results variance noise smaller. In more simple RF IC solutions, most likely there is less intelligence usable to determine how to use the raw phase information data that is captured.

In block 640, it is determined if there are more RF subgroups to undergo calibration. If so (block 640=Yes), the flow proceeds to block 620. If not (block 640=No), the flow proceeds to block 645. In block 645, the base station applies calibration information determined during block 635 to beamformer elements. The necessary information of phase data results is distributed between low level parts and higher level system as necessary to compensate the phase errors of the whole system. As previously described, the measurement and adjustment procedure can be performed in many different ways, but mainly results in division into to measurements calculations of corrections and applying the measured correction factors to the signal beamforming paths in digital and/or analogue domains.

Other possible implementation details are now presented. The couperline implementation can be implemented also inside RFICs chained on a PCB together, or couplers in PCB-layers, or, e.g., with coaxial cable chaining several TRXs together to a common chain. The couperline can be implemented also with impedances other than 50 ohm if the line width and layer thickness of PCB, etc., are all optimized to the same impedance for minimum reflections in the line. The RFICs may, e.g. at some point have an RF calibration chaining support or selection control support, but current 28 . . . 29 GHz RFICs do not yet have such support, so the exact implementation may vary.

Without in any way limiting the scope, interpretation, or application of the claims appearing below, a technical effect of one or more of the example embodiments disclosed herein is the ability to implement the exemplary embodiments in any future AAS implementation, e.g., by applying bi-directional couperline with selectivity of TRX port/ports under measurement. RF-sub groups calibration can be measured also with the same selective coupling principle involving searching for signal combining amplitude versus phase curves. The advantage and technical effect of not necessarily needing to use a calibration code in downlink data would provide an advantage, as there is no effect in downlink traffic throughput. Additionally, selective coupling use also in sub group calibration is a simple way of computing and is most likely a benefit in the future of 5G to have. The instant techniques can/may also calibrate distributed sub-element groups within a size of the mechanical structure in a single 5G unit, and this selective chained method of linking sub system phases to operate together can be used. Also if the RFIC vendors are having a significant remaining error of phases after RFIC internal phase locking, the selective couplerline solutions as described herein can be used for enhancement purposes, as overall error would be smaller than in other, conventional techniques.

Embodiments herein maybe implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 155 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3D three dimension(al)
5G fifth generation
AAS active antenna system
AD analog to digital
ASIC application-specific integrated circuit
BF beamforming
BJT binary junction transistor
DA digital to analog
DC direct current
DL downlink (from network to UE)
eNB (or eNodeB) evolved Node B (e.g., an LTE base station)
FD frequency division
FDD frequency division duplex
FET field effect transistors
FPGA field programmable gate array
GHz gigaHertz
HW hardware
IC integrated circuit
I/F interface
IF intermediate frequency
LO local oscillator
LTE long term evolution
MAX maximum
MiMo multiple input, multiple output
MIN minimum
MME mobility management entity
MOSFET metal-oxide-semiconductor field effect transistor
NCE network control element
N/W network
PCB printed circuit board
RF radio frequency
RFIC radio frequency integrated circuit
RRH remote radio head
Rx receiver
SGW serving gateway
Sw switch
TD time division
TDD time division duplex
Tx or TRX transmitter or transmission/reception
UE user equipment (e.g., a wireless, typically mobile device)
UL uplink (from UE to network)

What is claimed is:

1. An apparatus, comprising:
    an antenna arrangement, comprising:
        an antenna element and a corresponding feeder line configured to feed a signal to and from the antenna element;
        a portion of a couplerline spaced apart from but proximate to the antenna element, the feeder line, and a selectivity element, the portion of the couplerline configured to receive via inductive coupling the signal from one or both of the feeder line and the antenna element, and to transmit a signal via inductive coupling to one or both of the feeder line and the antenna element; and
        the selectivity element, which is spaced apart from but proximate to the antenna element, the feeder line, and the portion of the couplerline, and which is configured to select or not select the antenna element for coupling to the portion of the couplerline, wherein the selectivity element is configured to select or not select the antenna element for coupling to the portion of the couplerline at least by being positioned between the portion of the couplerline and one or both of the feeder line and the antenna element in order to affect the inductive coupling between the portion of the couplerline and the one or both of the feeder line and the antenna element.

2. The apparatus of claim 1, wherein:
    the selectivity element is configured during operation of the antenna element not to be coupled to a voltage or ground, which configures the selectivity element to select the antenna element for coupling to the portion of the couplerline; and
    the selectivity element is configured during operation of the antenna element to be coupled to ground to configure the selectivity element to not select the antenna element for coupling to the portion of the couplerline.

3. The apparatus of claim 1, wherein the selectivity element is positioned between the portion of the couplerline and the feeder line, and wherein an axis passes through the selectivity element, the portion of the couplerline, and the feeder line but does not pass through the antenna element, wherein each of the selectivity element, the portion of the couplerline, and the feeder line are on different planes, and wherein the axis is perpendicular to the planes.

4. The apparatus of claim 1, wherein an axis passes through the portion of the couplerline, the selectivity element, and the antenna element but does not pass through the feeder line, wherein each of the selectivity element, portion of the couplerline, and antenna element are on different planes, and wherein the axis is perpendicular to the planes.

5. The apparatus of claim 1, wherein the antenna arrangement further comprises a switch coupled to the selectivity element and configured to connect the selectivity element to ground or to not connect the selectivity element to ground.

6. The apparatus of claim 1, further comprising a plurality of the antenna arrangements, wherein the portions of the couplerlines for the plurality of the antenna arrangements are part of a single couplerline that serially connects to each of the plurality of antenna arrangements.

7. The apparatus of claim 6, wherein the apparatus further comprises at least one controller, and where the at least one controller is configured to cause the apparatus to:
place a signal on the feeder line;
configure at least one of the selectivity elements to select a corresponding at least one antenna element for coupling to the single couplerline; and
receive a signal from the portion of the single couplerline for antenna calibration.

8. The apparatus of claim 6, wherein the apparatus further comprises at least one controller, and where the at least one controller is configured to cause the apparatus to:
place a signal on the single couplerline;
configure at least one selectivity element to select a corresponding at least one antenna element for coupling to the single couplerline; and
receive a signal from the feeder line for antenna calibration.

9. The apparatus of claim 6, wherein the plurality of antenna arrangements are arranged in an array with columns and rows.

10. The apparatus of claim 6, wherein each of the plurality of antenna arrangements comprises a switch and a directional coupler, the switch configured to connect or not connect the couplerline to directional coupler, wherein each directional coupler is spaced apart from a corresponding feeder line but configured to inductively couple to the corresponding feeder line.

11. The apparatus of claim 6, wherein the couplerline is terminated at two ends, each of the two ends having a calibration port.

12. The apparatus of claim 11, wherein the calibration ports are part of a beamformer, and the beamform is configured to apply signals to each of the antenna elements for beamforming.

13. The apparatus of claim 11, further comprising at least one controller, where the at least one controller is configured to cause the apparatus to select individual ones or multiple ones of the plurality of antenna elements and perform antenna calibration with the individual ones or multiple ones of the plurality of antenna elements, the single couplerline and its calibration portions, and the selectivity elements.

14. The apparatus of claim 13, wherein the at least one controller further comprises one or more processors and one or more memories, the one or more memories comprising computer program code, and wherein the one or more memories and the computer program code are configured, with the one or more processors, to cause the apparatus to perform the antenna calibration.

15. The apparatus of claim 1, wherein the plurality of antenna arrangements form an antenna subarray, and wherein the apparatus comprises multiple subarrays, each with its own single couplerline.

16. The apparatus of claim 15, further comprising a plurality of couplings, each set of plurality of couplings configured to direct downlink traffic data and uplink traffic data toward corresponding individual ones of the antenna subarrays and to corresponding selective bi-directional calibration couplerlines.

17. The apparatus of claim 16, wherein the plurality of couplings and selective bi-directional calibration couplerlines are coupled to at least one controller, and wherein the at least one controller is configured to select individual ones of the sets of couplings to perform antenna calibration of a corresponding antenna subarray.

18. The apparatus of claim 16, wherein each antenna subarray has a corresponding beamformer and a set of the couplings, and each set of couplings directs downlink traffic data and uplink traffic data toward a corresponding beamformer.

19. An apparatus, comprising:
a plurality of antenna arrangements, each antenna arrangement comprising:
an antenna element and a corresponding feeder line configured to feed a signal to and from the antenna element;
a portion of a couplerline spaced apart from but proximate to the antenna element, the feeder line, and a selectivity element, the portion of the couplerline configured to receive via inductive coupling the signal from one or both of the feeder line and the antenna element, and to transmit a signal via inductive coupling to one or both of the feeder line and the antenna element; and
the selectivity element, which is spaced apart from but proximate to the antenna element, the feeder line, and the portion of the couplerline, and which is configured to select or not select the antenna element for coupling to the portion of the couplerline, wherein the selectivity element is configured to select or not select the antenna element for coupling to the portion of the couplerline at least by being positioned between the portion of the couplerline and one or both of the feeder line and the antenna element in order to affect the inductive coupling between the portion of the couplerline and the one or both of the feeder line and the antenna element;
a single couplerline comprising the portions of the couplerlines for the plurality of the antenna arrangements and serially connecting to each of the plurality of antenna arrangements;
one or more processors coupled to the plurality of antenna arrangements, and one or more memories, the one or more memories comprising computer program code, and wherein the one or more memories and the computer program code are configured, with the one or more processors, to cause the apparatus to:

place a signal on selected at least one of the plurality of feeder lines corresponding to the plurality of antenna arrangements;

configure a corresponding at least one of the selectivity elements to select a corresponding at least one antenna element for coupling to the single couplerline;

receive a signal from the single couplerline for antenna calibration; and perform the antenna calibration for the selected at least one antenna element.

20. The apparatus of claim 19, wherein the one or more memories and the computer program code are configured, with the one or more processors, to cause the apparatus, when configuring the corresponding at least one of the selectivity elements to select a corresponding at least one antenna element for coupling to the single couplerline, to:

configure the at least one selectivity element during operation of the corresponding antenna element not to be coupled to a voltage or ground, which configures the at least one selectivity element to select the corresponding at least one antenna element for coupling to the corresponding portion of the couplerline; and configure the at least one selectivity element during operation of the antenna element to be coupled to ground to configure the at least one selectivity element to not select the corresponding at least one antenna element for coupling to the corresponding portion of the couplerline.

* * * * *